(12) United States Patent
Dunbar et al.

(10) Patent No.: US 7,480,382 B2
(45) Date of Patent: Jan. 20, 2009

(54) IMAGE FILE CONTAINER

(75) Inventors: Geoffrey T. Dunbar, Kirkland, WA (US); Joseph D. Ternasky, Mountain View, CA (US); Kirt A. Debique, Seattle, WA (US); William M. Crow, Sequim, WA (US)

(73) Assignee: Microsoft Corporation, Redmond, WA (US)

( * ) Notice: Subject to any disclaimer, the term of this patent is extended or adjusted under 35 U.S.C. 154(b) by 832 days.

(21) Appl. No.: 10/674,742

(22) Filed: Sep. 30, 2003

(65) Prior Publication Data

US 2005/0071744 A1  Mar. 31, 2005

(51) Int. Cl.
*H04L 9/00* (2006.01)
(52) U.S. Cl. .................... 380/217; 380/201; 705/51; 705/57
(58) Field of Classification Search .......... 380/200, 380/217, 201, 214; 713/165, 160, 164; 705/51, 705/57
See application file for complete search history.

(56) References Cited

U.S. PATENT DOCUMENTS

| | | | |
|---|---|---|---|
| 5,262,860 A | 11/1993 | Fitzpatrick et al. |
| 5,321,750 A | 6/1994 | Nadan |
| 5,487,146 A | 1/1996 | Guttag et al. |
| 5,583,653 A | 12/1996 | Timmermans |
| 5,612,900 A | 3/1997 | Azadegan et al. |
| 5,745,484 A | 4/1998 | Scott |
| 5,764,974 A | 6/1998 | Walster et al. |
| 5,835,498 A | 11/1998 | Kim et al. |
| 5,838,678 A | 11/1998 | Davis et al. |
| 5,956,701 A | 9/1999 | Habermehl |
| 5,983,242 A | 11/1999 | Brown et al. |
| 6,041,345 A | 3/2000 | Levi et al. |
| 6,253,324 B1 | 6/2001 | Field et al. |

(Continued)

FOREIGN PATENT DOCUMENTS

EP  1 187 476 A1  10/2001

(Continued)

OTHER PUBLICATIONS

Anonymous: "QuickTime File Format", Apple Developer Manuals, Online!, Mar. 1, 2001, pp. 17-26, 33-36, 83-87, 111-115, 163-166, and 204.

(Continued)

*Primary Examiner*—Gilberto Barron, Jr.
*Assistant Examiner*—Samson B Lemma
(74) *Attorney, Agent, or Firm*—Lee & Hayes, PLLC

(57) ABSTRACT

An image container file has at least first and second multimedia streams (MSs). The first MS includes first image data representing an image. The second MS includes arbitrary data, which can for example, correspond to: a different representation of the same image; annotations to the first image data; second image data that together with the first image data form a new image with greater dynamic range, resolution, field of view or other attributes that can be derived from processing two or more independent images; or an executable file related to the first MS. The image container file can also include an extensible metadata to hold information describing one or more multimedia streams of the image container file. Further, the image container file may include DRM information to provide information related to obtaining a license to access encrypted data or verifying the authenticity of encrypted or unencrypted data.

73 Claims, 6 Drawing Sheets

U.S. PATENT DOCUMENTS

| | | | |
|---|---|---|---|
| 6,430,591 | B1 | 8/2002 | Goddard |
| 6,523,046 | B2 | 2/2003 | Liu et al. |
| 6,549,922 | B1 * | 4/2003 | Srivastava et al. ........... 707/205 |
| 6,598,097 | B1 | 7/2003 | Daniels et al. |
| 6,600,840 | B1 | 7/2003 | McCrossin et al. |
| 6,601,056 | B1 | 7/2003 | Kagle et al. |
| 6,608,933 | B1 | 8/2003 | Dowell et al. |
| 2004/0143760 | A1 * | 7/2004 | Alkove et al. ............... 713/201 |
| 2005/0086501 | A1 * | 4/2005 | Woo et al. ................... 713/189 |

FOREIGN PATENT DOCUMENTS

| | | |
|---|---|---|
| EP | 1521260 | 4/2005 |

OTHER PUBLICATIONS

Anonymous: "Copy-Protecting Movies", QuickTime Developer Series, 'Online!, 2002, pp. 1-7.

Anonymous: "QuickTime VR Authoring Studio", Apple Manuals, 'Online!, 1997, pp. iii-104 (entire manual).

Robert Casties, Dirk Wintergrun, Hans-Christoph Liess; "A Simple Metadata Format for Resource Bundles"; pythia.mpiwg-berlin.mpg.de/projects/storagesystem/ documents/files/meta-format.pdf; V1.0. 3; pp. 1-13; Sep. 9, 2003.

Brad McCabe; "Creating Custom Ink-Enabled Components, Creatinga reusable component and object"; Net Developer's Journal; Oct. 2003.

Stuart Weibel and Eric Miller; "Image Description on the Internet"; OCLC Online Computer Library Center, Inc. D-Lib Magazine; pp. 1-9; Jan. 1997.

* cited by examiner

IMAGE FILE CONTAINER

FIELD

The present invention relates generally to data processing and, more particularly, to storage and creation of image files.

BACKGROUND

In general, conventional image file formats provide for a single image to be stored in an image file. For example, a digital camera using such a conventional image file format would create a separate image file for each photograph taken. Thus, if a photographer used this camera to take several related images to form one overall photograph, each image would be stored in a separate image file, requiring the photographer or other user to manually organize and track the individual image files until they are integrated in a separate process. This manual task can be burdensome and prone to errors, especially if the photographer/user has a large number of images to manage.

Another shortcoming of conventional image file formats is that they generally do not support digital rights management (DRM) features. Thus, an image owner generally does not have access to the same level of intellectual property protection that is widely available or video and audio content.

An additional shortcoming of conventional image file formats is that they do not provide convenient integrated support for annotating images. For example, if a photographer or user wanted to provide an audio annotation for an individual image file or a group of related images using conventional image file formats, the photographer/user would typically have to store the audio annotations in a separate file and manually manage the association between these two files.

SUMMARY

In accordance with aspects of the various described embodiments, an image container file has at least a first multimedia stream and a second multimedia stream. The image container file can contain more than two multimedia streams. The first multimedia stream includes first image data representing an image. The second multimedia stream includes arbitrary data, typically related to the image of the first multimedia stream. For example, the arbitrary data can correspond to a different representation of the same image. The arbitrary data can also correspond to image, audio, video, graphics, text, date and time, location, web links, or animation annotations to the first image data. The arbitrary data can also correspond to second image data that is related in some way to the image data in the first multimedia stream. For example, the second multimedia stream may one of multiple multimedia streams corresponding to a series of images captured in over time, or a second image that can be combined with the first image data to form a new image with greater overall quality, such as greater dynamic range, pixel resolution, or field of view. The arbitrary data can also correspond to an application (i.e., an executable file) that can be used to view and/or process the first image data.

In another aspect, the image container file can also include an extensible metadata object to hold information describing one or more image representations stored in the image container file. The metadata can include information related to the image (or audio or video clip) such as the title; the creator; subject; a description, the publisher; contributor, date, format, language, and other types of information that may be desirable depending on the application. Metadata can also make reference to the other streams in the image file container on a per-container or per-stream basis.

In still another aspect, the image container file may store one or more image representations and/or other multimedia streams in encrypted format. In this case, the image container file will include digital rights information. For example, the digital rights information may be related to obtaining a license to access encrypted data contained in the image container file.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
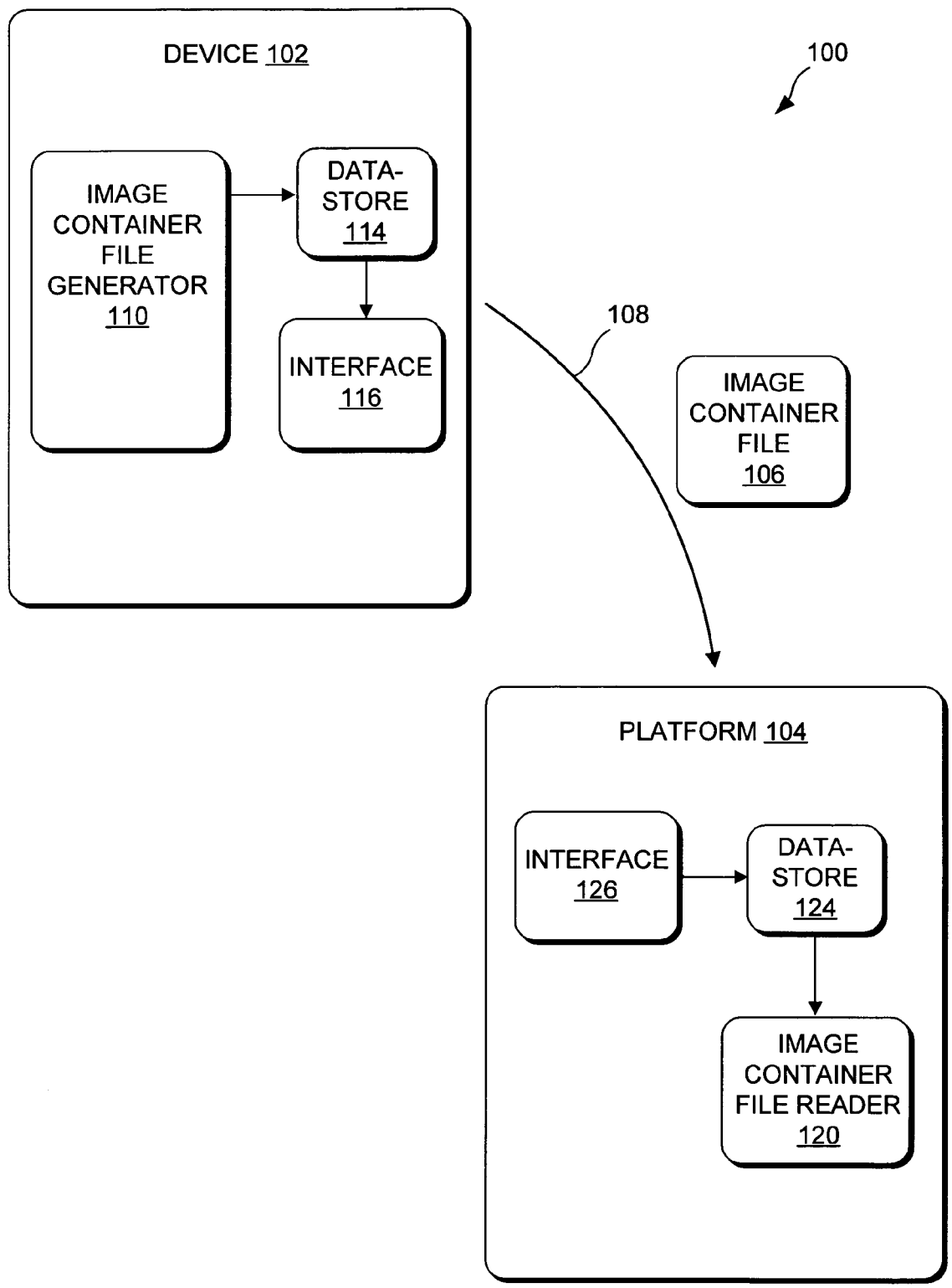
FIG. 1 is a block diagram illustrating a system using an image container file, according to one embodiment.

FIG. 1 illustrates a simplified system 100 using an image container file, according to one embodiment. In this embodiment, system 100 includes a device 102 and a platform 104. In a typical application, device 102 is an image generating device such as, for example, a digital camera, scanner, mobile telephone (with camera), a personal computer with camera, personal digital assistant (PDA) with camera, television set-top box with still-image capture, video tape player with still-image capture, digital versatile disc (DVD) player with still-image capture, or other suitable image sensing/capturing device or apparatus. Platform 104 is typically implemented with a personal computer, storage device (e.g., a hard drive, compact disk, digital versatile disc (DVD), tape, network storage, or other storage media), printer, or other suitable device or apparatus for storing or viewing images. Other embodiments of system 100 may be implemented using multiple devices similar to device 102, or multiple platforms similar to platform 104, or a combination of such devices and platforms. In this embodiment, the image container file can be transferred between device(s) and/or platform(s) interchangeably.

In this embodiment, device 102 includes an image container file generator 110, a data store 114, and an interface 116 to a communications medium. Platform 104, in this embodiment, includes an image container file reader 120, a datastore 124 and an interface 126. In other embodiments (e.g., when platform 104 is used mainly as storage), image file reader 120 may be omitted.

Device 102 can send an image container file 106 (generated by image container file generator 110 and stored in datastore 114) to platform 104 via interface 116 and a link 108. By way of example, link 108 can be a direct wired connection, a wireless connection, a network (e.g., a local area network, the Internet, telephone system, etc.), direct transportation of removable media from device 102 to platform 104 (removable disk media, flash memory media, CD-ROM, DVD-RW or DVD+RW), etc. Platform 104 receives image container file 106 via interface 126 and stores it in datastore 124. Data contained in image container file 106 can then be accessed via image container file reader 120, as desired by a user.

Unlike systems that use conventional image file formats, system 100 uses image container file 106 to provide a flexible, extensible, backward-compatible mechanism to store images, image annotations, digital rights management (DRM) information and other arbitrary information in a self-describing manner. Embodiments of image container file 106 are described in more detail below in conjunction with FIGS. 3-6.

Figure 2:
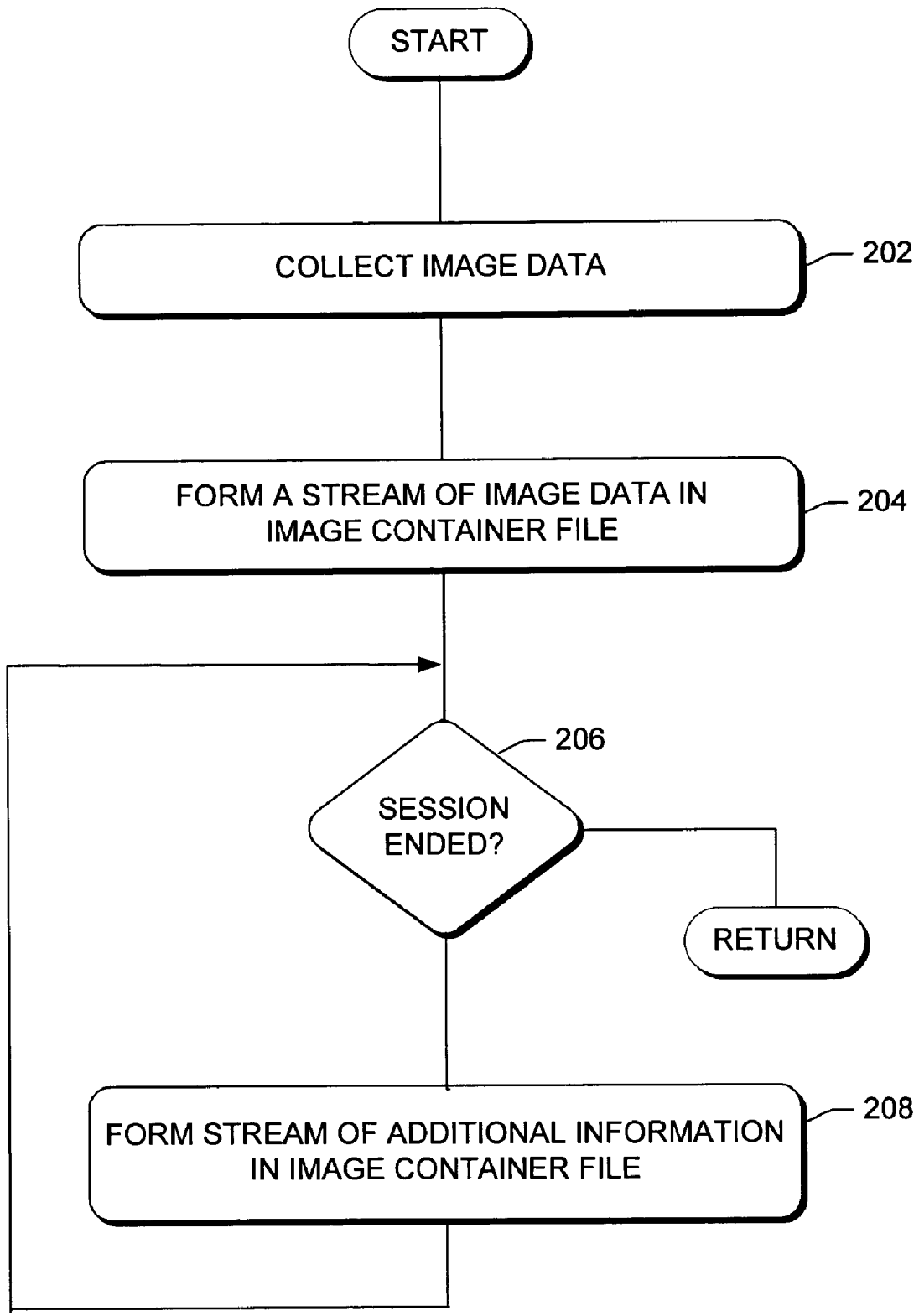
FIG. 2 is a flow diagram illustrating the formation of an image container file, according to one embodiment.

FIG. 2 illustrates the formation of image container file 106 (FIG. 1), according to one embodiment. Referring to FIGS. 1 and 2, this embodiment of device 102 forms an image container file as follows. In a block 202, device 102 collects image data. In one embodiment, the image data is collected from an image sensor (not shown). For example, the sensor may be a charge-coupled device (CCD) of a digital camera. The image data is then stored in datastore 114. In some embodiments, the image data may be processed by the device and then stored in datastore 114. The image data may be raw sensor data; uncompressed image data (i.e., raw data that is processed into an uncompressed representation of the image); compressed image data (e.g., according to the Joint Photographic Experts Group (JPEG) or other suitable compression format). The format of the image data generally depends on the processing performed by the device, and as will be described below, image container file 106 is designed to accept any format.

In a block 204, device 102 stores the image data from block 202 as a multimedia stream in image container file 106. As used herein, a multimedia stream in this context typically refers to (but is not limited to) a single image or information used to represent a single image, a portion of recorded video, a portion of recorded audio, or an executable object or application. In one embodiment, image container file generator 110 obtains the image data from datastore 114 and stores information related to the image data and the overall organization of image container file in a header portion of image container file 106. Image file generator 110 also stores at least some of the image data (e.g., pixel data) in a data portion of image container file 106. In this embodiment, the image container file generator may also store location information for the image data stored in the data portion in an index portion of the image container file. For example, this location information may include an offset from a preselected point of the image container file. In some embodiments, the index object may be omitted (e.g., when the image container file contains only image data representing a single image). The header, data, and index portions form components of this embodiment of image container file 106 (e.g., see FIG. 3 described below). In other embodiments, image container file 106 may include other components. For example, some additional components are described below in conjunction with FIGS. 4 and 5.

In decision block 206, device 102 determines whether additional information is to be associated with the image data collected in block 202. For example, device 102 may include a microphone and appropriate processing components for recording audio segments. The user can make an audio annotation to the image data collected in block 202 by activating the audio recording components and speaking into the microphone. In this embodiment, image container file generator 110 is configured to detect when the audio recording feature is activated for annotating the image data collected in block 202.

Device 102 may include other features that generate information to be associated with the image data collected in block 202. Examples of such features include (but are not limited to): (a) automatic generation of proof or thumbnail size images and full scale representations of a single image; (b) generation of a sequence of individual images that will later be processed to create a panoramic image; (c) generation of a single image having multiple representations for different exposure settings, white balance settings, compression settings, pixel resolutions, color space (e.g., a color space for printing and a different color space for display using a monitor), field of view, color context (described further below); (d) generation of other annotations (e.g., video, graphic, text annotations); and (e) appending executable applications (e.g., an application needed to interpret raw image data, or to decode a proprietary compression format). In one embodiment, streams of video and audio data are added to image container file 106 in a manner substantially similar to the advanced systems format (ASF). Each additional piece of data is added an additional multimedia stream with header information about the data stored in the header portion and the data itself stored in the data portion of image container file 106.

As used herein, a color space is a mathematical space within which color values can be defined by a (typically) small number of color coordinates. For example, the RGB color space uses three coordinates (labeled R, G and B) to specify a color and the CMYK color space uses four different coordinates (C, M, Y and K) to specify a color. The color values in these two spaces behave differently. RGB is typically used to describe light, which is additive, and CMYK is typically used to describe ink, which is subtractive. Converting color values from one color space to another can be done, but in some cases this will degrade the color values.

As used herein, a color context defines what the color coordinates actually mean, with reference to some objective standard. For example, several devices can use the RGB color space, but the same RGB color values displayed on each of these devices might not look the same (even under the same viewing conditions). This is caused because each of the devices is using a different color context.

If in decision block 206 image container file generator 110 determines that no additional information is to be associated with the image data collected in block 202, the image container file is complete and the operational flow in forming an image container file terminates. Otherwise, the operational flow proceeds to a block 208.

Returning to FIG. 2, in block 208, device 104 forms another multimedia stream. If the additional information is image data for another representation of the image, image container file generator 110 performs block 208 in substantially the same manner as previously described for blocks 202 and 204. That is, in this embodiment, image container file generator 110 generates header information and stores it in the header portion, stores at least some of the image data (e.g. pixel data) to the data portion and stores location information for this new image information in the index portion. If the additional information is not image data, image container file generator 110 will perform substantially the same operations, but the header information will include information specific to the additional information in the header portion of image container file 106. For example, the header information could include indicating whether the additional information is audio data, video data, an executable application, etc. The operational flow then returns to decision block 206 to determine if another multimedia stream should be formed.

Figure 3:
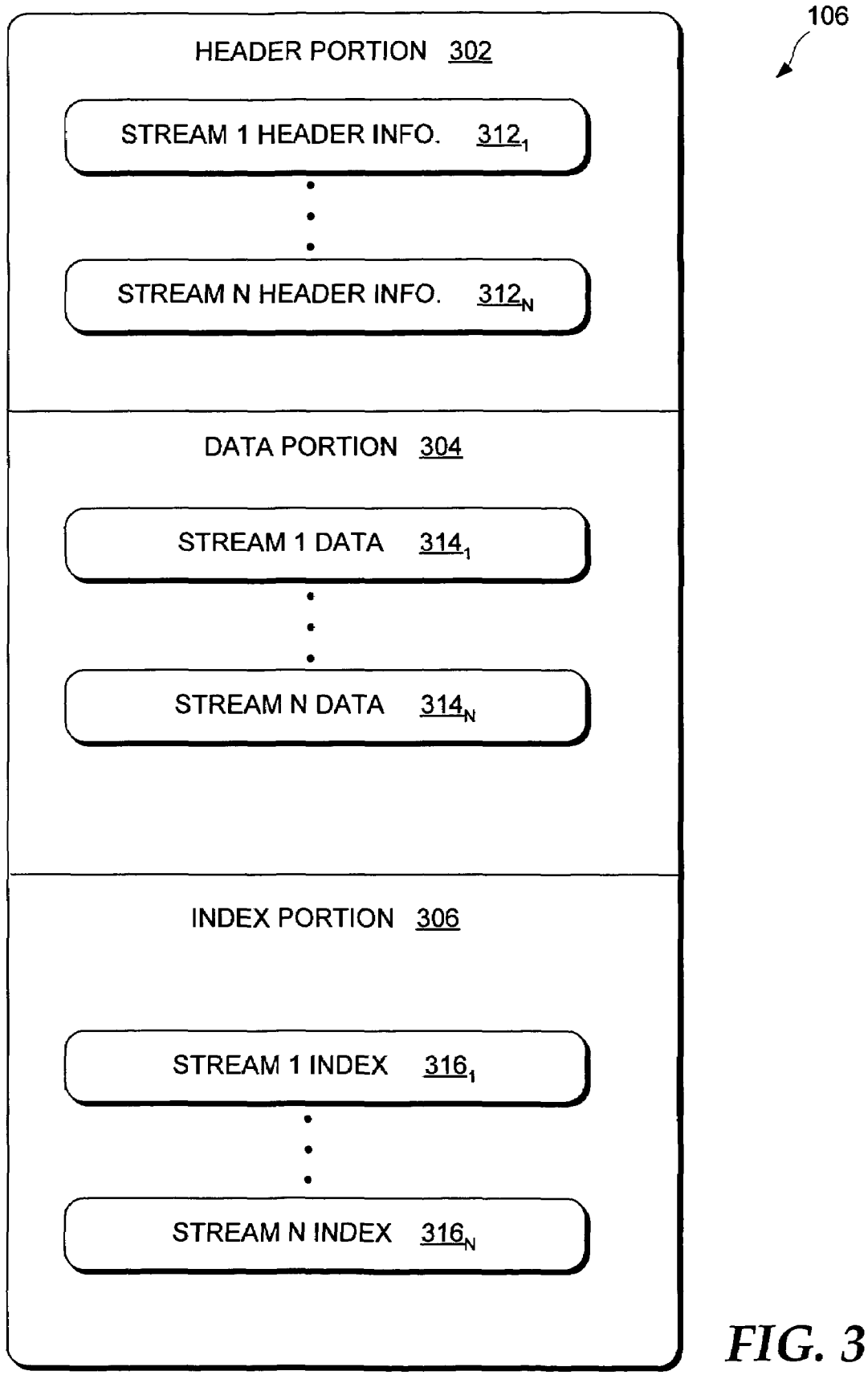
FIG. 3 is a block diagram illustrating components of an image container file, according to a first embodiment.

FIG. 3 illustrates components of image container file 106 (FIG. 1), according to a first embodiment. In this embodiment, image container file 106 includes a header portion 302, a data portion 304 and an index portion 306. Header portion 302 includes header information for each multimedia stream contained in image container file 106. In this illustrative image container file, header portion 302 includes header information $312_1$ through $312_N$ for a first multimedia stream through an Nth multimedia stream, respectively. Header information includes information such as, for example, the basic properties of the multimedia stream, language present in the multimedia stream, properties of the index information stored in index portion 306 for the multimedia stream, padding information that specifies padding in the header information. Header information may also include information identifying the compression algorithm for this multimedia stream, script commands embedded in the header information, marker information identifying markers embedded in the data (stored in data portion 304) for the multimedia stream. In other embodiments, header information may include information about other properties of the multimedia stream. In one embodiment, header information is formed in a manner similar (but simplified) to that of the aforementioned ASF format. The above description for header portion 302 is illustrative of a particular embodiment; however, in other embodiments, header portion 302 can be formed using any suitable format (e.g., different header information formats, definitions etc.).

Data portion 304, in this example, includes data $314_1$ through $314_N$ for the first through Nth multimedia streams, respectively. In one illustrative embodiment, packets are used to store data in data portion 306. Although a packet data storage embodiment is described in more detail below, in other embodiments different approaches may be used to store data in data portion 304. In this illustrative embodiment, the packets can have a variable size up to four gigabytes since images can be quite large. In other embodiments, the packets may be of fixed size or of different size. The packets representing data from different streams may be optionally interleaved in some embodiments. That is, a packet from stream A may be followed by a packet from stream B and then additional packets from stream A, allowing device 102 to generate the information in any order. Further, a packet may contain data from more than one multimedia stream. Still further, multiple packets may be used to store the data of a single multimedia stream. This packet approach provides flexibility in storing multimedia data in data portion 304. As previously described, the data contained in data portion 304 may be, for example, image data (raw, uncompressed and/or compressed). Further data portion 304 may contain image data representing multiple representations of a single image, image data for multiple images to be combined into a single image. Still further, data portion 304 may include audio data, video data, graphics, or text data to annotate image data, and/or executable program code to operate on or process image data contained in the data object.

Index portion 306 includes index $316_1$ through index $316_N$ for the first through Nth multimedia streams, respectively. As previously mentioned, the index information is used to locate desired portions of data in the data object. In one embodiment, index object 306 is substantially similar to the index object used in the aforementioned ASF format. In other embodiments, other suitable indexing mechanisms may be used.

Figure 4:
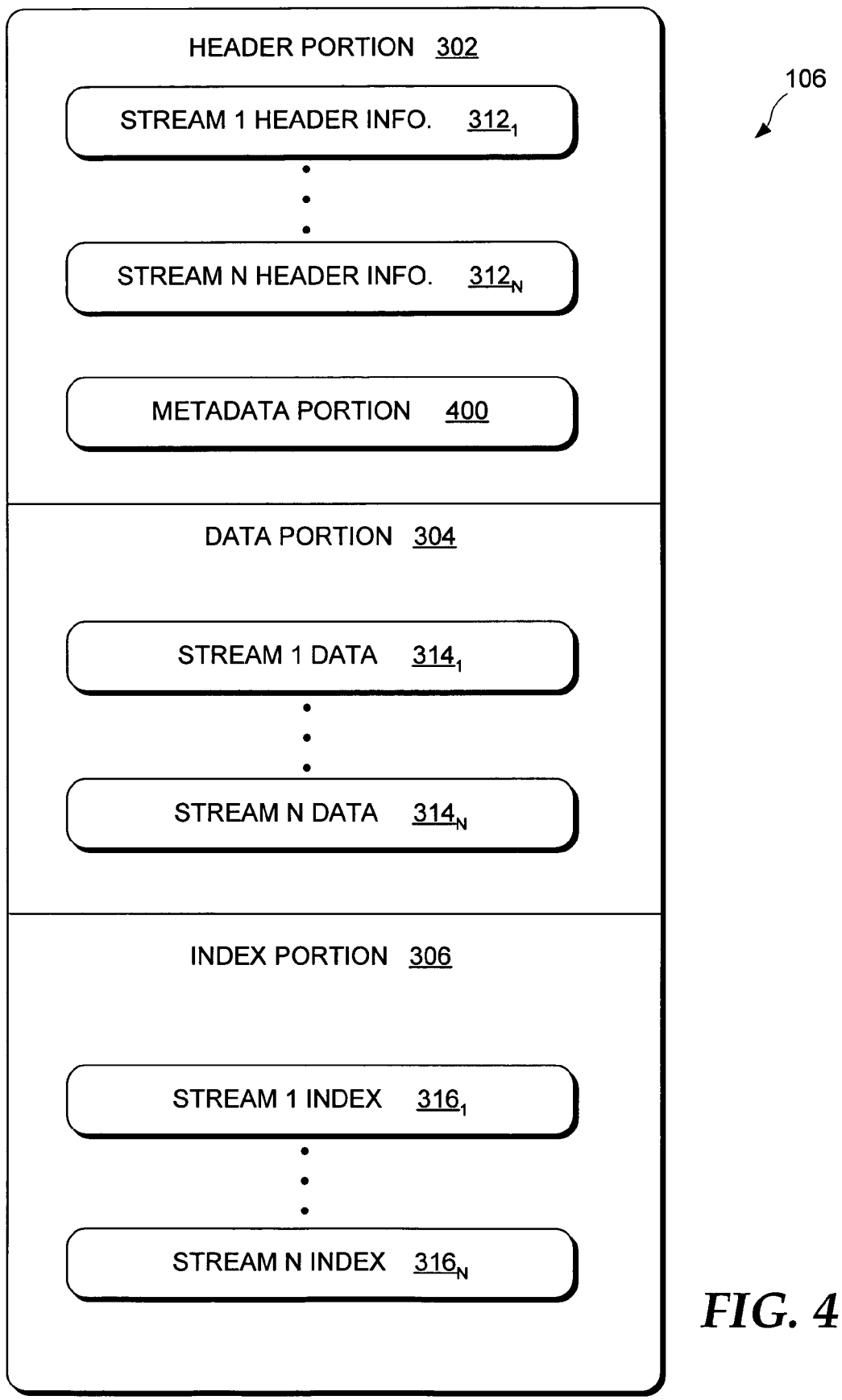
FIG. 4 is a block diagram illustrating components of an image container file, according to a second embodiment.

FIG. 4 illustrates components of image container file 106 (FIG. 1), according to a second embodiment. This embodiment is substantially similar to the embodiment of FIG. 3, except that this embodiment includes a metadata portion 400 in header portion 302. Metadata portion 400 provides a mechanism for metadata to be associated with all of the multimedia streams of image container file 106, or with one or more particular multimedia stream(s) of image container file 106. In addition, metadata portion 400 allows an end user of image file container 106 to access the metadata without having to process data portion 304 and index portion 306. Still further, metadata portion 400 provides an extensible metadata format to provide flexibility in adapting image container file 106 for other applications.

In one embodiment, metadata portion 400 allows for one or more namespaces to be defined, with individual metadata items in each namespace including a self-describing name field and an associated value field. In one embodiment, this metadata content is mapped into extensible markup language (XML). In one embodiment, a namespace may contain metadata items having definitions that are substantially similar to those in the Dublin Core Metadata Initiative (DCMI) Metadata Terms issued Mar. 4, 2003 and the DCMI Type Vocabulary issued Feb. 12, 2003. Alternative or additional metadata namespaces may also include definitions substantially similar to those corresponding to other established metadata standards. For example, these other formats include the exchangeable Image File Format for Digital Still Cameras (EXIF) Version 2.2, April 2002, by the Japan Electronic Industry Development Association (JEIDA) and/or the Information Interchange Model (IIM) version 4.1 issued July 1999 by the International Press Telecommunications Council (IPTC). Other standardized or application-specific self-describing namespace may also be included in metadata portion 400.

Metadata portion 400 can include information related to the image (or audio or video clip) such as the title; the creator; subject; a description, the publisher; contributor, date, format, language, and other types of information that may be desirable depending on the application. Because metadata portion 400 is extensible, applications and/or users can define their own metadata and such extensions can be used simultaneously within a single container and metadata portion without conflict.

Figure 5:
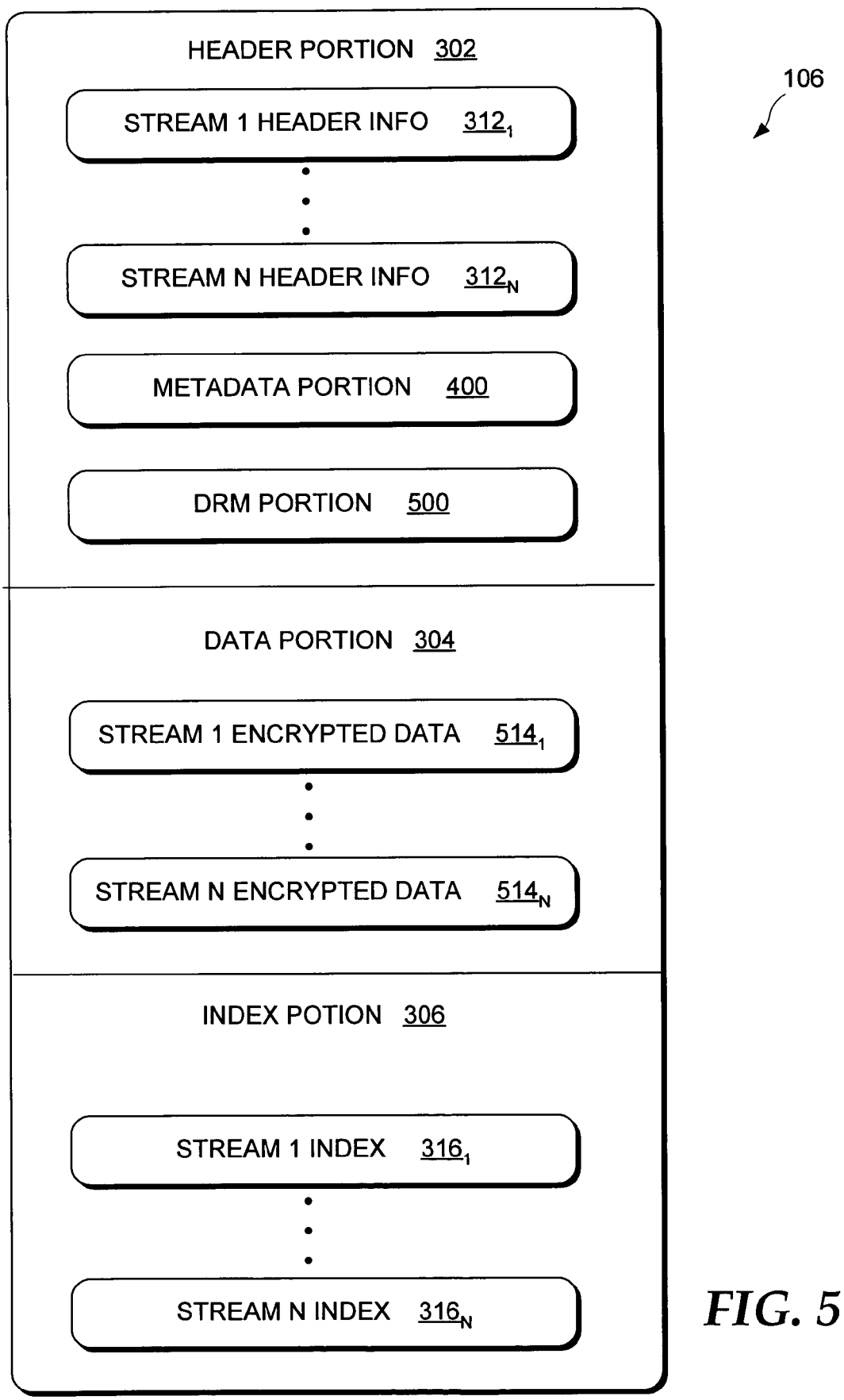
FIG. 5 is a block diagram illustrating components of an image container file, according to a third embodiment.

FIG. 5 illustrates components of image container file 106 (FIG. 1), according to a third embodiment. This embodiment is substantially similar to the embodiment of FIG. 4, except that this embodiment includes a digital rights management (DRM) portion 500 in header portion 302 and encrypted data $514_1$ through $514_N$ for the first through Nth multimedia streams, respectively (instead of data $314_1$ through $314_N$ as in the embodiment of FIG. 4). In one embodiment, DRM portion 500 includes information related to accessing encrypted data $514_1$-$514_N$. For example, DRM portion 500 may include the universal resource locator (URL) of a license server (i.e., from which users may obtain a license to use the image and other data contained in image container file 106). The license can include a key for decryption of encrypted data $514_1$-$514_N$. The DRM information can also be related to verifying the authenticity the image data. In other embodiments, the encryption can be applied on a per multimedia stream basis.

Figure 6:
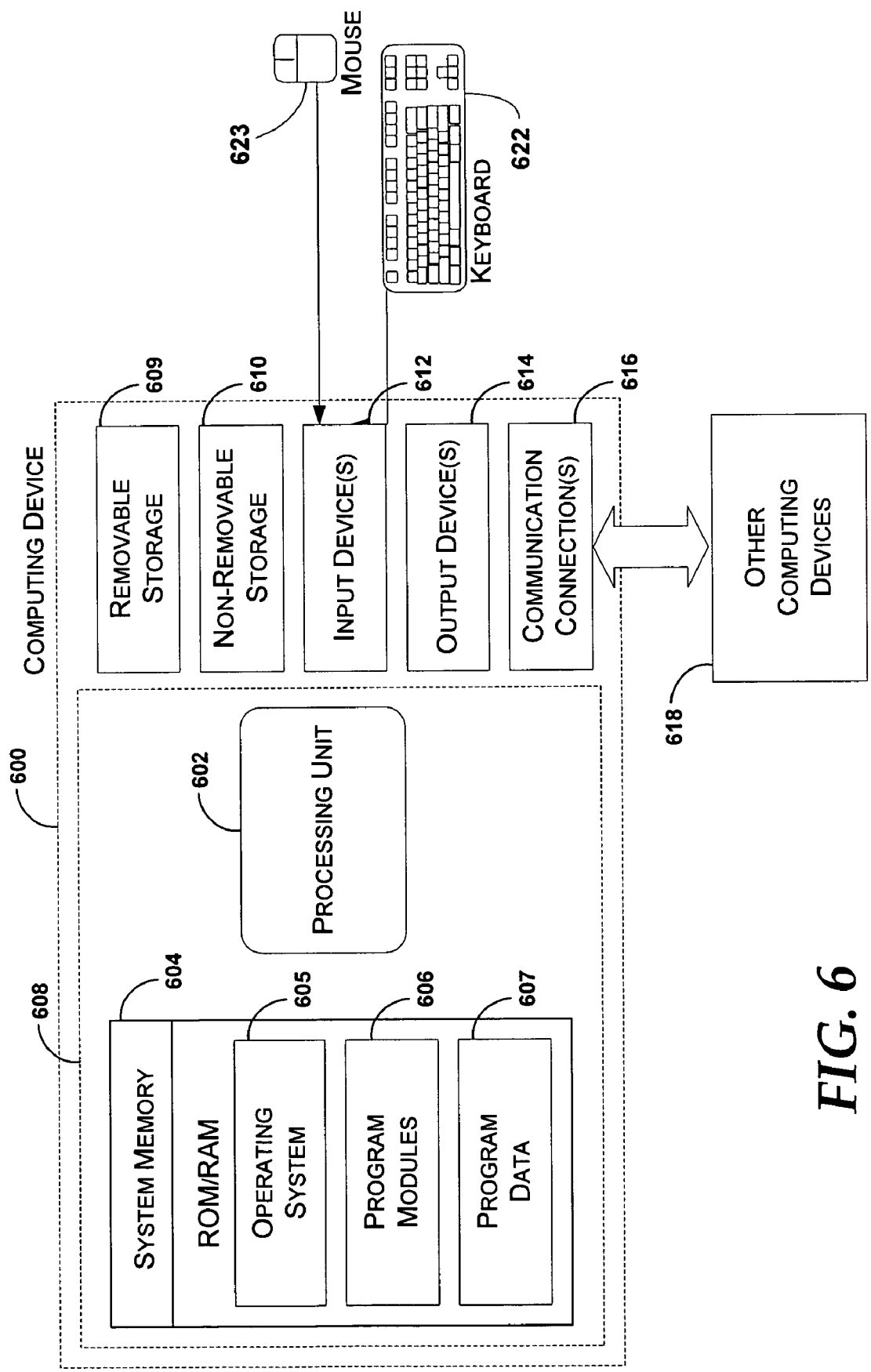
FIG. 6 is a block diagram illustrating an exemplary computing environment suitable for forming or using an image container file, according to one embodiment.

FIG. 6 illustrates a general computer environment 600, which can be used to implement the techniques described herein. For example, device 102 and platform 104 may each include a computer environment substantially similar to general computer environment 600. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

With reference to FIG. 6, one exemplary system for implementing the invention includes a computing device, such as computing device 600. In a very basic configuration, computing device 600 typically includes at least one processing unit 602 and system memory 604. Depending on the exact configuration and type of computing device, system memory 604 may be volatile (such as RAM), non-volatile (such as ROM, flash memory, etc.) or some combination of the two. System memory 604 typically includes an operating system 605, one or more program modules 606, and may include program data 607. This basic configuration of computing device 600 is illustrated in FIG. 6 by those components within dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard 622, mouse 623, pen, voice input device, touch input device, scanner, etc. Output device (s) 614 such as a display, speakers, printer, etc. may also be included. These devices are well known in the art and need not be discussed at length here.

Computing device 600 may also contain communication connections 616 that allow the device to communicate with other computing devices 618, such as over a network. Communication connections 616 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-readable storage medium encoded with a data structure for use in an image file to store data, the data structure comprising:
   a data portion comprising:
   first still image data related to a first multimedia stream of multimedia data, wherein the first still image data represents at least a first pixel format;
   first arbitrary data related to a second multimedia stream of multimedia data, wherein the second multimedia stream comprises second still image data, and wherein the second image data represents at least a second pixel format; and a header portion comprising:
   a first header object comprising information related to the first multimedia stream; and a second header object comprising information related to the second data multimedia stream, wherein the first and second image data provide different representations of a single image.

2. The computer-readable medium of claim 1, wherein the data portion includes data related to three or more multimedia streams.

3. The computer-readable medium of claim 1, wherein the first still image data and the second still image data comprise compressed and uncompressed image data, respectively.

4. The computer-readable medium of claim 1, wherein the first still image data is derived from a first camera setting and the second still image data is derived from a second camera setting.

5. The computer-readable medium of claim 1, wherein the second still image data represents the single image having a second pixel format different from the first pixel format, wherein a pixel format includes one or more components, component ordering, and component numeric formats.

6. The computer-readable medium of claim 1, wherein the first still image data is further derived using a first color space and second still image data is further derived from a second color space.

7. The computer-readable medium of claim 1, wherein the first still image data is further derived using a first color context and second still image data is further derived from a second color context.

8. The computer-readable medium of claim 1, wherein the first still image data further represents the single image having a first field of view, and the second still image data further represents the single image having a second field of view.

9. The computer-readable medium of claim 1, wherein the first still image data comprises raw image sensor data.

10. The computer-readable medium of claim 1, wherein the second multimedia stream includes data representing an annotation of an image represented by the first still image data.

11. The computer-readable medium of claim 10, wherein the second multimedia stream comprises audio data.

12. The computer-readable medium of claim 1, wherein the second multimedia stream comprises an executable component.

13. The computer-readable medium of claim 1, wherein the second multimedia stream comprises second still image data, wherein data from the first still image data and data from the second still image data to be combined to represent an image that is larger than individual images represented by the first and second still image data.

14. The computer-readable medium of claim 1, wherein the second multimedia stream comprises second still image data, wherein data from the first still image data and data from the second still image data to be combined to represent an image that is of higher quality than individual images represented by the first and second still image data.

15. The computer-readable medium of claim 1, wherein the data structure further comprises metadata.

16. The computer-readable medium of claim 1, wherein the data structure further comprises an index portion to contain information related to a location of data stored in the data portion.

17. The computer-readable medium of claim 1, wherein data stored in the data portion is encrypted.

18. The computer-readable medium of claim 1, wherein the header portion further comprises digital rights management information.

19. The computer-readable medium of claim 18, wherein the digital rights management information contains information related to obtaining a license to access the first still image data.

20. The computer-readable medium of claim 18, wherein the digital rights management information contains information related to obtaining a license to verify the authenticity of the first still image data.

21. The computer-readable medium of claim 1, wherein the multimedia data structure is compatible with advanced systems format (ASF).

22. The computer-readable medium of claim 1, wherein the second multimedia stream further comprises audio, video, graphics, text, date and time, location, web links, or animation data.

23. A method for forming an image container file for storing data associated with one or more multimedia streams, comprising: collecting still image data; forming a first multimedia stream in the image container file, the first multimedia stream including a first still image data derived from the collected image data and a first header object having information related to the first still image data, wherein the first still image data represents at least a first pixel format;
collecting arbitrary data associated with the collected image data; and forming a second multimedia stream in the image container file, the second multimedia stream including first arbitrary data derived from the collected arbitrary data~wherein the first arbitrary data comprises second image data where the second image data represents at least a second pixel format, and a second header object having information related to the first arbitrary data, wherein the first and second image data provide different representations of a single image.

24. The method of claim 23, wherein the first and second still image data comprise compressed and uncompressed image data, respectively.

25. The method of claim 23, wherein the first still image data is derived from a first camera setting and the second still image data is derived from a second camera setting.

26. The method of claim 23, wherein the first still image data further represents the single image having a first pixel resolution, and the second still image data further represents the single image having a second pixel resolution different from the first pixel resolution.

27. The method of claim 23, wherein the the second still image data represents the single image having a second pixel format different from the first pixel format.

28. The method of claim 23, wherein the first still image data is further derived using a first color space and second still image data is further derived from a second color space.

29. The method of claim 23, wherein the first still image data is further derived using a first color context and second still image data is further derived from a second color context.

30. The method of claim 23, wherein the first still image data comprises raw image sensor data.

31. The method of claim 23, wherein the first arbitrary data comprises data representing an annotation of an image represented by the first still image data.

32. The method of claim 31, wherein the first arbitrary data comprises audio, video, graphics, text, date and time, location, web links, or animation data.

33. The method of claim 23, wherein the first arbitrary data comprises an executable component.

34. The method of claim 23, wherein the first arbitrary data comprises second still image data, wherein data from the first still image data and data from the second still image data to be combined to represent an image that is larger than individual images represented by the first and second still image data.

35. The method of claim 23, wherein the first arbitrary data comprises second still image data, wherein data from the first still image data and data from the second still image data to be combined to represent an image that is of higher quality than individual images represented by the first and second still image data.

36. The method of claim 23, further comprising adding metadata to the image container file.

37. The method of claim 23, further comprising forming an index portion to contain information related to a location of data stored in the image container file.

38. The method of claim 23, further comprising storing digital rights management information in the image container file.

39. The method of claim 38, wherein the digital rights management information contains information related to obtaining a license to access the first still image data.

40. The method of claim 38, wherein the digital rights management information contains information related to verifying the authenticity the first still image data.

41. The method of claim 23, wherein the image file container contains encrypted data.

42. The method of claim 23, wherein the multimedia data structure is compatible with advanced systems format (ASF).

43. The method of claim 23, further comprising forming a plurality of multimedia streams in the image container file, the plurality of multimedia streams including the second multimedia stream, wherein another multimedia stream in the plurality of multimedia streams includes second arbitrary data and a third header object having information related to the second arbitrary data.

44. A system for storing image data, the system comprising:
an image data receiver; and an image file generator to form an image container file to store image data, the image container file having a plurality of multimedia streams, the plurality of multimedia streams including a first multimedia stream and a second multimedia stream, wherein the first multimedia stream to include first still image data derived from image data received by the image data receiver, the second multimedia stream to include arbitrary data, wherein the arbitrary data comprises second still image data, the first and second still image data providing different representations of a single image.

45. The system of claim 44, wherein the arbitrary data comprises data representing an annotation of an image represented by the first still image data.

46. The system of claim 45, wherein the arbitrary data comprises audio, video, graphics, text, date and time, location, web links, or animation data.

47. The system of claim 44, wherein the arbitrary data comprises an executable component.

48. The system of claim 44, wherein the arbitrary data comprises second still image data, wherein data from the first still image data and data from the second still image data to be combined to represent an image that is larger than individual images represented by the first and second still image data.

49. The system of claim 44, wherein the arbitrary data comprises second still image data, wherein data from the first still image data and data from the second still image data to be combined to represent an image that is of higher quality than individual images represented by the first and second still image data.

50. The system of claim 44, wherein the image file generator is further to add metadata to the image container file.

51. The system of claim 44, wherein the image file generator is further to add index information related to locations of first still image data and the first arbitrary data within the image container file.

52. The system of claim 44, wherein the image container file contains encrypted data.

53. The system of claim 44, wherein the image file generator is further to store digital rights management information in the image container file.

54. The system of claim 53, wherein the digital rights management information contains information related to obtaining a license to access the first still image data.

55. The system of claim 53, wherein the digital rights management information contains information related to verifying the authenticity of the first still image data.

56. The system of claim 44, wherein the image container file can be accessed using a multimedia viewer.

57. The system of claim 56, wherein the multimedia viewer comprises a viewer than can view advanced systems format (ASF) files.

58. A computer-readable medium having components as recited in claim 44.

59. A system comprising: means for collecting image data; and means for generating an image container file to store image data, the image container file including a plurality of multimedia streams, the plurality of multimedia streams including a first multimedia stream and a second multimedia stream, wherein the first multimedia stream includes first still image data derived from image data received by the image data receiver, the second multimedia stream includes arbitrary data, wherein the arbitrary data comprises second still image data, the first and second still image data providing different representations of a single image.

60. The system of claim 59, wherein the arbitrary data comprises data representing an annotation of an image represented by the first still image data.

61. The system of claim 60, wherein the arbitrary data comprises audio, video, graphics, text, date and time, location, web links, or animation data.

62. The system of claim 59, wherein the means for generating selectively encrypts data contained in the image container file.

63. The system of claim 59, wherein the arbitrary data comprises an executable component.

64. The system of claim 59, wherein the means for generating includes means for adding metadata to the image container file.

65. The system of claim 59, wherein the means for generating includes means for storing index information related to locations of the first still image data and the first arbitrary data within the image container file.

66. The system of claim 59, further comprising means for storing digital rights management information in the image container file.

67. The system of claim 66, wherein the digital rights management information contains information related to obtaining a license to access the first still image data.

68. The system of claim 66, wherein the digital rights management information contains information related to verifying the authenticity of the first still image data.

69. A computer-readable medium having components as recited in claim 59.

70. The computer-readable medium of claim 4, wherein the camera settings comprise exposure settings.

71. The computer-readable medium of claim 4, wherein the camera settings comprise white balance settings.

72. The method of claim 25, wherein the camera settings comprise exposure settings.

73. The method of claim 25, wherein the camera settings comprise white balance settings.

* * * * *